United States Patent
Amano

(10) Patent No.: US 12,277,280 B2
(45) Date of Patent: Apr. 15, 2025

(54) INPUT DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 18/506,465

(22) Filed: Nov. 10, 2023

(65) Prior Publication Data

US 2024/0201800 A1     Jun. 20, 2024

(30) Foreign Application Priority Data

Dec. 20, 2022    (JP) ................................. 2022-202863

(51) Int. Cl.
     *G06F 3/0362*      (2013.01)
     *B60K 35/00*      (2024.01)
     (Continued)

(52) U.S. Cl.
     CPC ............ *G06F 3/0362* (2013.01); *B60K 35/00* (2013.01); *B60K 35/10* (2024.01); *G06F 3/044* (2013.01);
     (Continued)

(58) Field of Classification Search
     CPC .... G06F 3/0362; G06F 3/044; G06F 3/04817; G06F 2203/04104; G06F 3/03547; G06F 2203/04101; G06F 2203/04108; G06F 3/0393; G06F 3/04186; G06F 3/04847; G06F 3/04883; B60K 35/00; B60K 35/10; B60K 35/28; B60K 2360/119; B60K 2360/126; B60K 2360/1434; B60K 2360/168
See application file for complete search history.

(56) References Cited

U.S. PATENT DOCUMENTS

| | | | | |
|---|---|---|---|---|
| 2009/0009491 A1* | 1/2009 | Grivna | ............... | H03K 17/9622 |
| | | | | 345/184 |
| 2011/0199301 A1* | 8/2011 | Zhao | ....................... | G06F 3/038 |
| | | | | 345/158 |

(Continued)

FOREIGN PATENT DOCUMENTS

| | | |
|---|---|---|
| FR | 3 115 618 A | 4/2022 |
| JP | 2020-190832 A | 11/2020 |

(Continued)

OTHER PUBLICATIONS

Extended European Search Report from EP 23216276.8, Jun. 3, 2024, 12 pgs.

*Primary Examiner* — Md Saiful A Siddiqui

(74) *Attorney, Agent, or Firm* — Crowell & Moring LLP

(57) ABSTRACT

An input display device includes a display configured to display an image, a capacitive touch panel attached to the display, a knob that is at least one three-dimensional operation unit on a front face of the touch panel, and a sensing unit configured to measure an electrostatic capacitance of the touch panel and sense an operation on the touch panel based on the measured electrostatic capacitance. The sensing unit senses the rotation amounts of all the fingers touching the knob, and determines that the rotation operation on the knob has been performed when a sensed rotation amount of any of the fingers reaches a threshold value.

13 Claims, 8 Drawing Sheets

(51) Int. Cl.
    *B60K 35/10*         (2024.01)
    *B60K 37/06*         (2006.01)
    *G06F 3/044*         (2006.01)
    *G06F 3/04817*       (2022.01)
    *B60K 35/28*         (2024.01)

(52) U.S. Cl.
    CPC .......... *G06F 3/04817* (2013.01); *B60K 35/28* (2024.01); *B60K 2360/119* (2024.01); *B60K 2360/126* (2024.01); *B60K 2360/1434* (2024.01); *B60K 2360/168* (2024.01); *G06F 2203/04104* (2013.01)

(56) References Cited

U.S. PATENT DOCUMENTS

| | | | |
|---|---|---|---|
| 2014/0313168 | A1 | 10/2014 | Luo |
| 2016/0294387 | A1* | 10/2016 | Maigler ................ H03K 17/98 |
| 2017/0052617 | A1* | 2/2017 | Okuzumi .............. G06F 3/0362 |
| 2017/0052636 | A1* | 2/2017 | Yoshinaka ............ G06F 3/0362 |
| 2018/0364853 | A1 | 12/2018 | Pahud |
| 2020/0081557 | A1* | 3/2020 | Togashi ................ G06F 3/0362 |
| 2022/0129104 | A1* | 4/2022 | Mitsunari ............... G06F 3/044 |
| 2023/0400924 | A1 | 12/2023 | Gaillard et al. |

FOREIGN PATENT DOCUMENTS

| | | |
|---|---|---|
| WO | WO 2020/208794 A1 | 10/2020 |
| WO | WO 2022/113253 A1 | 6/2022 |

\* cited by examiner

FIG. 6
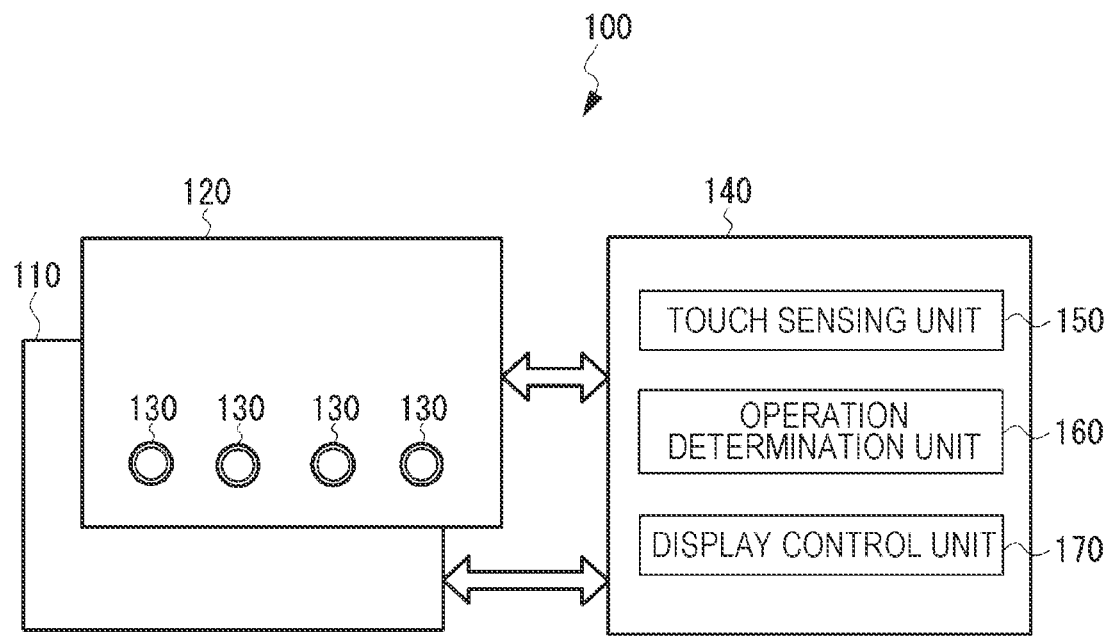
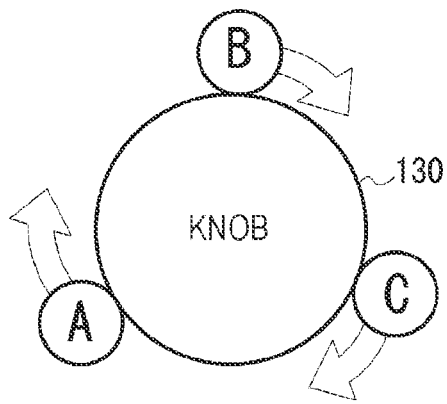
FIG. 7A
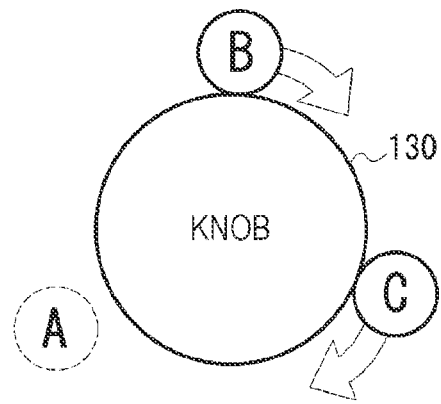
FIG. 7B

INPUT DISPLAY DEVICE

RELATED APPLICATION

The present application claims priority to Japanese Patent Application No. 2022-202863, filed Dec. 20, 2022, the entirety of which is herein incorporated by reference.

BACKGROUND

1. Field

The present disclosure relates to an input display device having a human-machine interface function, and more particularly, to an input display device including a three-dimensional operation unit.

2. Description of the Related Art

An input display device is disclosed in which a protrusion is provided on a touch panel disposed to be superimposed on a display, and an image such as an operation icon is displayed at a position overlapping the protrusion (for example, JP 2020-190832 A). The user performs an input by performing a touch operation on the protrusion.

SUMMARY

In a display device that performs an operation with a capacitive touch panel, a user interface (hereinafter, referred to as a three-dimensional UI) has been proposed in which a cover glass has an uneven shape to allow a touch position to be tactilely recognized and the touch position can be understood without looking.

FIG. 1A is an operation example of a conventional flat touch panel, where a user U visually recognizes an operation icon 12 displayed on a display 10, and performs an input by performing a touch operation on the position of the operation icon 12 (note in the example of Figure).

FIG. 1B is an operation example of a touch panel having a three-dimensional UI, and FIG. 1C is a schematic cross-sectional view of the three-dimensional UI. A transparent cover lens 26 having an uneven shape is attached onto a touch panel 24, and a display 20 displays an operation icon 22 at a position overlapping the cover lens 26. The user U performs input by touching the cover lens 26 with a finger. A highly sensitive electrostatic sensor capable of sensing the electrostatic capacitance (distance) of the finger even when the finger is away from the sensor is used for the touch sensing, and the presence or absence of the touch can be determined even with the thick cover lens 26. This makes it possible to reduce touch mistakes (operation error) under a situation where it is difficult to look at the in-vehicle display during driving.

Among three-dimensional UIs, there is a cylindrical knob (button). In the operation on the knob, the rotation operation is performed by sliding a side face of the knob with a finger pad, and the knob does not actually rotate. For example, as illustrated in FIG. 2A, an icon 40 indicating a function (for example, volume or the like) assigned to the operation of a knob 30 is displayed at the lower part of the knob 30, and a gauge (scale) 50 indicating the rotation amount of the rotation operation on the knob 30 is displayed around the knob 30.

As in the knob of the mechanical switch, the user holds the cylindrical knob 30 with the fingers U, and slides the finger pad on the side face of the knob 30 to rotate the fingers U, as illustrated in FIG. 2B. When referring to a gauge 50 and further performing the rotation operation, the user returns the finger U to the original position, as illustrated in FIG. 2C, and slides the finger pad again on the side face of the knob 30 to rotate the fingers U.

The touch panel senses circumferential movement of the fingers U touching the knob 30 and determines a rotation operation on the knob. FIG. 3A illustrates movement of fingers when the right rotation operation is performed on the knob 30 with two fingers. The conventional sensing algorithm of the rotation operation determines the rotation operation from the circumferential movement of one finger on the knob. As illustrated in FIG. 3B, when the finger U moves on the circumference by, for example, 45 degrees, it is determined that the rotation operation is performed on the knob 30, and the display of one scale of the gauge 50 is increased or decreased.

When the knob is operated, the number of fingers sensed by the operation method of the user is assumed to vary.

Assuming operation with one hand, the number of fingers operating the knob is 1 to 5.

The distance of the finger operating the knob from the sensor of the touch panel varies depending on the finger. For example, as illustrated in FIG. 4, the distance from the sensor is closest to the finger U1, slightly close to the finger U2, and away from the finger U3. There is a finger that is not sensed when the distance from the sensor increases, or sensing of the finger disappears when the finger moves away or is removed from the knob during the rotation operation.

The distance between adjacent fingers is not uniform.

When the distance between the two fingers is too short, sensing is performed as one finger, or when the removed finger approaches during the rotation operation, sensing of the finger disappears.

In such a situation, when sensing of the referred finger repeatedly disappears before the rotation amount (for example, 45 degrees) for determining the presence or absence of the rotation operation is reached, a situation may occur in which the determination of rotation is not smoothly made, no matter how much the user turns the knob. For example, when four fingers U1 to U4 are sensed on the knob 30, as illustrated in FIG. 5A, and then the finger U4 is removed, as illustrated in FIG. 5B, the number of sensed fingers is reduced to three, and in a case where the finger U4 is referred to, the determination of rotation of the knob cannot be made. As illustrated in FIG. 5C, when the finger that is away approaches the knob, the number of sensed fingers increases to five. When the distance between the finger U4 and the finger U5 is too short, the finger U4 and the finger U5 are recognized as one finger, and when the finger U4 is referred to, the error of the sensed rotation amount increases, and the accuracy of the determination of rotation of the knob decreases. For this reason, in order to stably determine the rotation operation, a sensing algorithm considering movements of a plurality of fingers and an increase or decrease in the number of fingers to be sensed is required.

The present disclosure solves such a conventional problem. An object of the present disclosure is to provide an input display device capable of improving determination accuracy of a rotation operation on a three-dimensional operation unit.

An input display device according to the present disclosure includes a display configured to display an image, a capacitive touch panel attached to the display, at least one three-dimensional operation unit on a front face of the touch panel, and a sensing unit configured to measure an electrostatic capacitance of the touch panel and sense an operation on the touch panel based on the measured electrostatic capacitance, wherein the sensing unit senses rotation amounts of all fingers touching the operation unit, and determines that a rotation operation on the operation unit is performed when a sensed rotation amount of any of the fingers reaches a threshold value.

In one aspect, in a case where sensing of a finger disappears before a rotation amount of the finger having a largest rotation amount reaches the threshold value, the sensing unit updates rotation amounts of remaining fingers to a rotation amount of the finger having the largest rotation amount. In an aspect, in a case where sensing of a finger touching the operation unit is added in a middle of the rotation, the sensing unit allocates a rotation amount of a finger having a largest rotation amount to a rotation amount of an added finger. In an aspect, the sensing unit resets a sensed rotation amount of a finger when determining that a rotation operation on the operation unit is performed. In an aspect, the input display device further includes a display unit configured to display a gauge, corresponding to a rotation operation, around the operation unit of the display. In an aspect, the display unit displays an icon representing an input operation at a corresponding position of the operation unit of the display. In an aspect, the operation unit has a cylindrical knob shape, a cylindrical button shape, or a cylindrical finger grip shape.

According to the present disclosure, the rotation operation on the operation unit is determined based on the sensing result of the rotation amounts of all the fingers touching the operation unit, so that the rotation operation of the operation unit can be stably determined, even if the number of sensed fingers increases or decreases.

BRIEF DESCRIPTION OF THE DRAWINGS

FIG. 6 is a block diagram illustrating a configuration of an input display device according to an embodiment of the present disclosure;

FIGS. 7A-B are diagrams for describing an overview of the disclosure of the input display device according to the embodiment of the present disclosure;

DETAILED DESCRIPTION

Figure 1A:
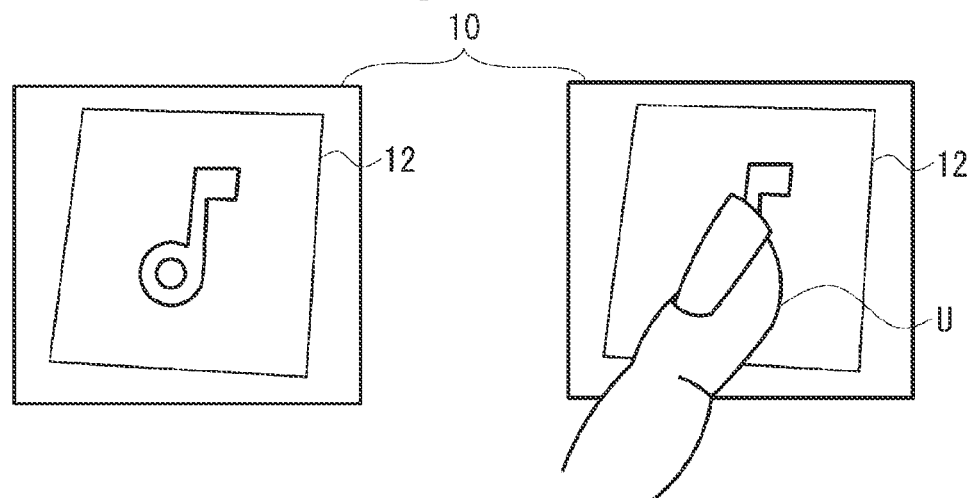
FIG. 1A illustrates an operation example of a flat touch panel.
Figure 1B:
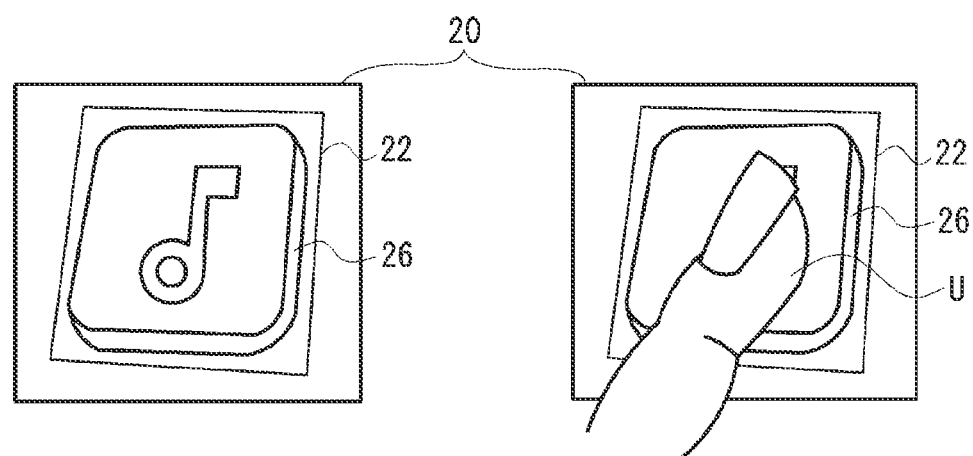
FIG. 1B illustrates an operation example of a touch panel of a three-dimensional UI.
Figure 1C:
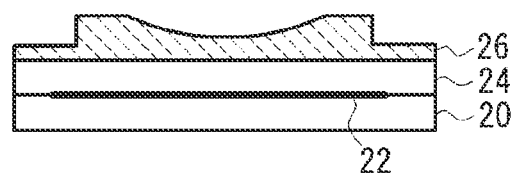
FIG. 1C is a schematic cross-sectional view of the three-dimensional UI.

Embodiments of the present disclosure will now be described. An input display device of the present disclosure provides an interface between a person and a machine. The input display device of the present disclosure is not particularly limited, but is applied to, for example, an electronic device equipped with a display with a touch panel on which a three-dimensional UI unit is formed. The electronic device equipped with the display with a touch panel is, for example, an in-vehicle device having a navigation function, an audio visual function, a television function, and/or the like.

Next, embodiments of the present disclosure will be described in detail with reference to the drawings. FIG. 6 is a block diagram illustrating a configuration of an input display device according to an embodiment of the present disclosure. An input display device 100 of the present embodiment includes a display 110 configured to display an image and a video, a capacitive touch panel 120 mounted on the display 110, a three-dimensional UI unit (or an operation unit) 130 having one or a plurality of three-dimensional shapes attached to the front face of the touch panel 120, and a controller 140 that controls image display of the display 110, touch sensing of a touch panel 120, and the like.

The display 110 is not particularly limited, but includes, for example, a liquid crystal panel or an organic EL panel, and displays image data provided from the controller 140. For example, an icon representing an input operation of the three-dimensional UI unit 130 is displayed at the lower part of the three-dimensional UI unit 130.

The touch panel 120 includes, for example, a plurality of sensors (sensing units) formed at positions where a plurality of X-side and Y-side electrode lines intersect, and the sensors sense a change in electrostatic capacitance when a user's finger, hand, or the like approaches or comes into contact with the touch panel 120. The touch panel 120 is mounted on the display 110 and provides an input interface for the user to make an input to an icon or the like displayed on the display 110.

The touch panel 120 further includes one or more three-dimensional UI units (operation units) 130 on the front face of the transparent panel. FIG. 6 illustrates an example in which four three-dimensional UI units 130 are attached at the lower part of the touch panel 120, but the number and size of the three-dimensional UI units 130 are not particularly limited. The three-dimensional UI unit 130 may be made of a transparent material (for example, acrylic, polycarbonate, glass, and the like) so that an icon displayed on the display 110 can be visually recognized. The bottom face of the three-dimensional UI unit 130 may be attached to the touch panel 120 using, for example, a double-sided adhesive or may be integrally molded with a cover glass attached to the front face of the touch panel 120.

Information regarding the position and shape of the three-dimensional UI unit 130 (for example, coordinates on the touch panel, shapes, sizes, and heights of the bottom face and the front face, and the like) is registered in a memory or the like in the controller 140. For example, when the three-dimensional UI unit 130 is a cylindrical knob, the coordinates of the center of the bottom face of the knob, the radius or diameter of the bottom face/front face of the knob, the height of the side face, and the like are registered. When a finger approaching the touch panel 120 is sensed, the controller 140 refers to the information about the registered position and shape of the three-dimensional UI unit 130 and determines whether the finger is a touch operation on the three-dimensional UI unit 130.

In the present embodiment, the three-dimensional UI unit 130 includes at least a cylindrical knob or button (see FIG. 2 for example) on which the user can perform a rotation operation (hereinafter, the three-dimensional UI unit 130 may be referred to as a knob 130). When performing a rotation operation on the knob 130, the user performs an operation of holding the knob 130 with one or a plurality of fingers and sliding a side face of the knob 130 with finger pads. When such a rotation operation is performed, the coordinates of the finger touching the knob 130 are sensed, the rotation amount of the finger is sensed based on the sensed coordinates of the finger, and the presence or absence of the rotation operation on the knob is determined from the sensed rotation amount. Details of the determination of the rotation operation will be described later.

The controller 140 includes hardware and/or software resources, and performs overall processing of the input display device using, for example, an arithmetic processing unit, a microcontroller including a ROM/RAM, or the like. For example, display processing of the display 110, touch sensing or touch operation determination (i.e., sense touch position and finger distance, sense rotation amount of finger touched by knob, and determine presence or absence of rotation operation) from an output value of the touch panel 120, and processing of video display/video switching according to the touch sensing or the touch operation determination are performed.

As illustrated in FIG. 6, the controller 140 includes a touch sensing unit 150, an operation determination unit 160, and a display control unit 170. These units 150, 160, 170, may be implemented by the controller 140, including the hardware and/or software resources referenced above. The touch sensing unit 150 drives the plurality of electrode lines on the X side and/or the Y side of the touch panel 120 at a constant cycle (for example, 60 fps (frames per second)), measures the electrostatic capacitance of the sensing unit of the driven electrode lines, senses the touch position of the finger or the like based on the measurement result, and provides the sensing result to the operation determination unit 160.

The operation determination unit 160 determines the presence or absence of a touch operation on the touch panel 120 or a touch operation (for example, a rotation operation on the knob) on the three-dimensional UI unit 130 based on the sensing result of the touch sensing unit 150. Here, the touch includes not only contact of the user's finger to the touch panel 120 or the three-dimensional UI unit 130 but also approach of the finger to the touch panel 120 or the three-dimensional UI unit 130. For example, when the user's finger touches or approaches the touch panel 120, the touch sensing unit 150 senses the presence or absence of a touch based on a change in electrostatic capacitance of a corresponding sensor, and similarly, when the user's finger touches or approaches the three-dimensional UI unit 130, the touch sensing unit senses the presence or absence of a touch on the three-dimensional UI unit 130 based on a change in electrostatic capacitance of a corresponding sensor.

The display control unit 170 displays an image and a video on the display 110, and displays a GUI image related to the operation of the three-dimensional UI unit 130 in an area where the three-dimensional UI unit 130 exists. In addition, the display control unit 170 switches an image to be displayed on the display 110 to another image in response to the operation determination unit 160 determining that a touch operation has been performed.

Next, an outline of a sensing algorithm of the rotation operation on the knob by the input display device 100 of the present embodiment will be described. In the present embodiment, the conventional problem is solved by an algorithm that can stably continue the rotation sensing even when the number of fingers sensed at the time of the rotation operation on the knob increases or decreases.

As illustrated in FIG. 7A, when the fingers A, B, and C touching the knob 130 are sensed, all the coordinates of the fingers A, B, and C are observed, and rightward rotation or leftward rotation is determined from the movement direction of the coordinates. By observing all the finger, even when sensing of the finger A disappears along the way, the determination of rotation is continued by referring to the remaining sensed fingers B and C, for example, as illustrated in FIG. 7B.

Since the amount of movement of the finger during the rotation operation is different for each finger, the rotation angle of the finger having the largest rotation amount is referred to. In FIG. 7A, when the rotation amounts (amounts of movement) of the fingers are A>B>C, the finger A having the largest rotation amount is referred to, and the rotation operation on the knob 130 is determined based on the rotation amount of the finger A. However, it should be noted that the rotation amounts of the remaining fingers B and C are also continuously monitored. When sensing disappears due to, for example, the finger A being referred to being removed from the knob 130, the rotation amount of the remaining finger B for which the sensing is being continued is referred to (because B>C). As described above, the knob rotation sensing is performed in consideration of the movement of the plurality of fingers and the increase or decrease in the number of sensed fingers.

Figure 8A:
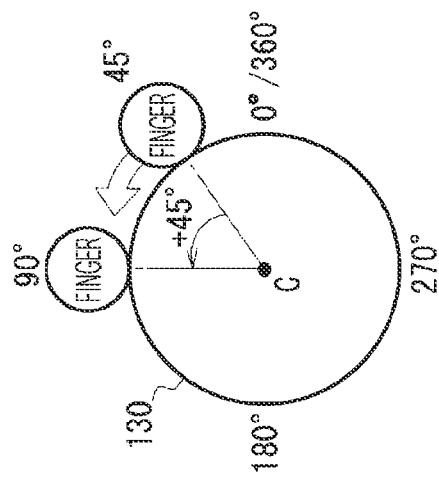
FIGS. 8A-C are diagrams for describing a method of sensing a rotation amount of a finger touching a knob in an embodiment of the present disclosure.

Next, details of the input display device 100 of the present embodiment will be described. First, a method of sensing the rotation amount of the finger will be described. As illustrated in FIG. 8A, a 0° position serving as a reference is set with respect to the coordinates of the center point C of the knob 130, and an angle corresponding to a position when a finger touches the knob circumference can be calculated. In the example of the drawing, the right side is set to 0°, and the angle is set to increase counterclockwise.

Figure 8B:
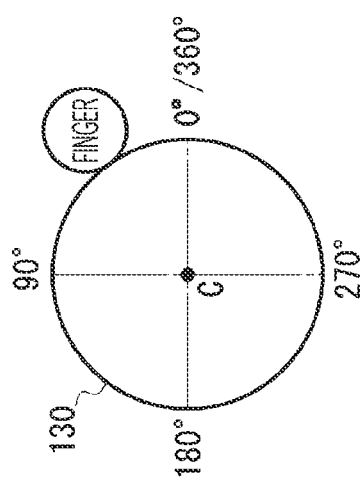

A finger angle is sensed from coordinates on a circumference of the knob 130 touched by a finger. For example, as illustrated in FIG. 8B, when the coordinates of the finger touching the knob 130 are in the middle of the circumference between 0° and 90°, 45° is calculated as the finger angle. The relationship between the coordinates of the finger on the knob circumference and the finger angle is calculated using, for example, a trigonometric function.

Figure 8C:
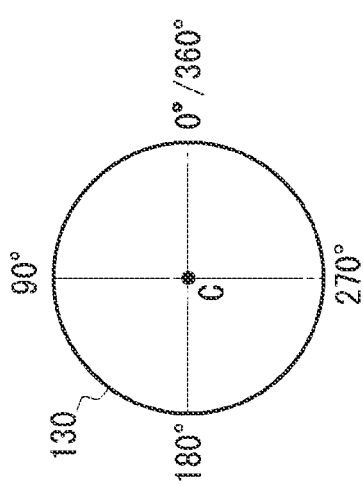

Next, the rotation amount (change amount) is calculated from the amount of movement of the finger on the circumference. For example, as illustrated in FIG. 8C, in a case where the finger moves to a point where the coordinates of the finger are 90°, that is, in a case where the finger moves from the position where the finger angle is 45° to the position where the finger angle is 90°, 45° is calculated as the rotation amount in accordance with the rotation operation on the knob 130.

Next, a method of determining the presence or absence of the rotation operation from the rotation amount will be described. In the present embodiment, to realize smooth rotation sensing even when the number of sensed fingers increases or decreases during the rotation operation on the knob, the presence or absence of the rotation operation is determined by looking at the magnitude of the amount of movements of all the fingers touching the knob in a composite manner.

1. Sense presence or absence of finger touching knob and finger angle

As described with reference to FIG. 8B, the touch sensing unit 150 measures the capacitance of each sensor of the touch panel 120 at a constant measurement cycle, and senses the coordinates of the touch position of the finger from the measurement result. When the sensed coordinates of the finger correspond to the coordinate position of the knob 130 registered in advance, the operation determination unit 160 determines that the finger touches the knob 130. When a plurality of fingers touches the knob 130, coordinates of touch positions of the plurality of fingers are sensed. When touch of a finger on the knob 130 is sensed, the operation determination unit 160 calculates a finger angle of the touched finger.

2. Sense rightward or leftward rotation operation amount of all sensed fingers

As described with reference to FIG. 8C, when the rotation operation is performed on the knob 130, the coordinates of the finger sensed by touch sensing unit 150 change. The operation determination unit 160 calculates the finger angle from the changed coordinates of the finger, and calculates the rotation amount of the finger from the difference between the finger angles.

Figure 2A:
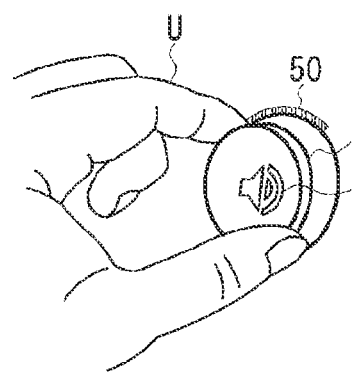
FIGS. 2A-C are diagrams for describing an example of a rotation operation of a knob as a three-dimensional UI.
Figure 2B:
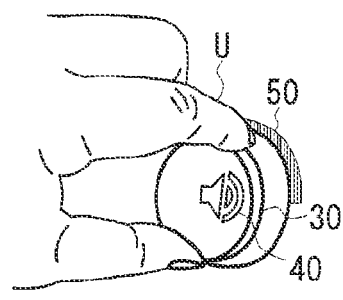
Figure 2C:
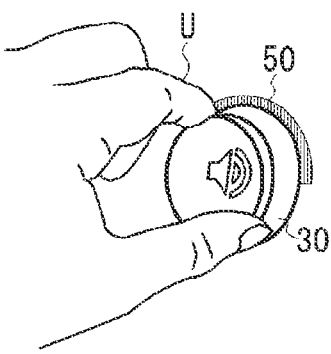
Figure 3A:
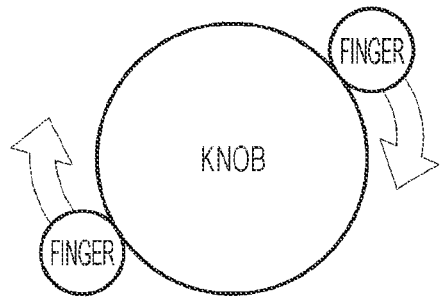
FIG. 3A is a diagram illustrating circumferential movement of a finger touching a knob.
Figure 3B:
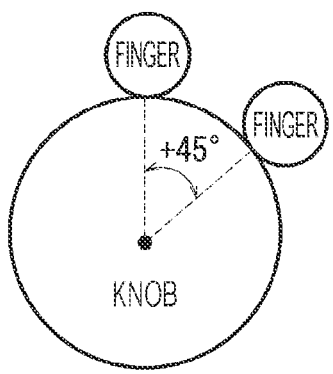
FIG. 3B is a diagram illustrating a sensing example of a rotation amount of the fingers touching the knob.
Figure 4:
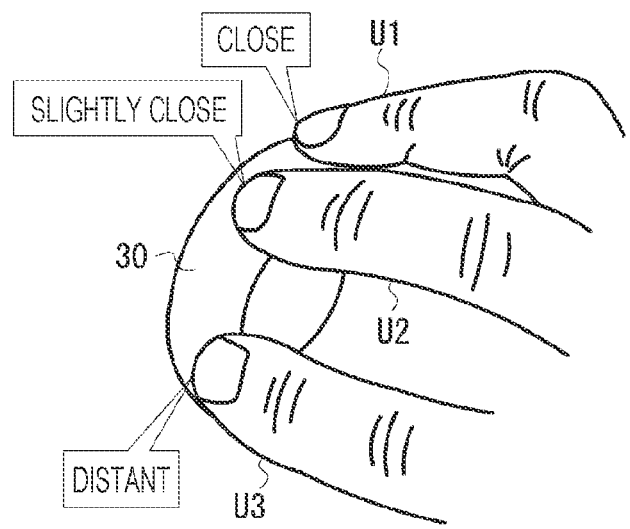
FIG. 4 is a diagram for describing variations in distance between fingers touching a knob from a sensor.
Figure 5A:
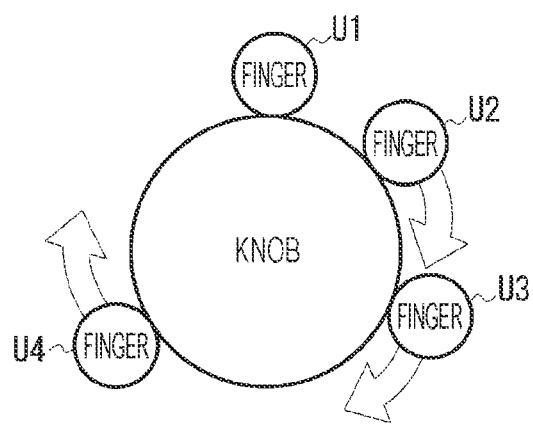
FIGS. 5A-C are diagrams illustrating an example in which the number of sensed fingers touching a knob increases or decreases.
Figure 5B:
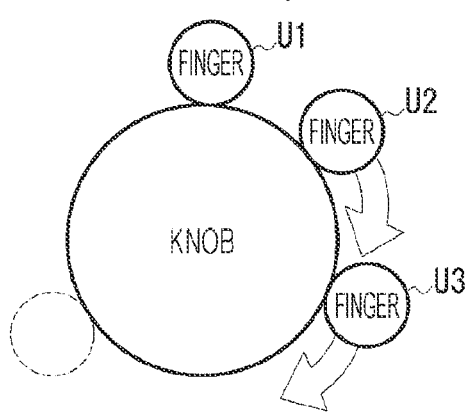
Figure 5C:
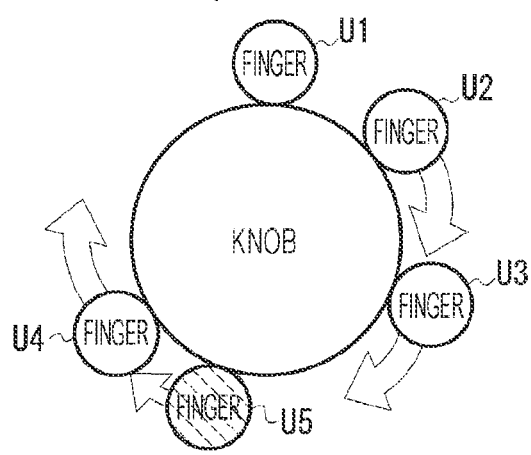
Figure 9A:
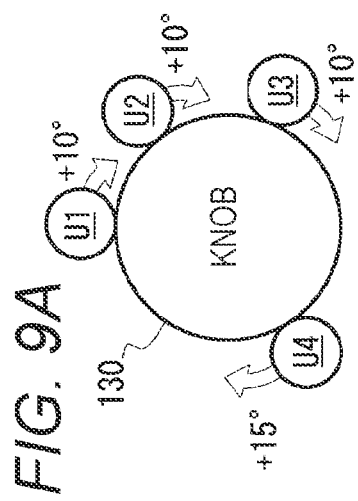
FIGS. 9A-G are diagrams for describing a method of determining a rotation operation on a knob when the number of sensed fingers increases or decreases according to the embodiment of the present disclosure.

3. Determine that there is a rotation operation on the knob when rotation amount of any one of fingers exceeds a threshold value For example, as illustrated in FIG. 9A, it is assumed that the touch of the fingers U1 to U4 on the knob 130 is sensed, the fingers U1, U2, and U3 rotate and move by +10°, and the finger U4 rotates and moves by +15°. Assuming that the threshold value for determining the rotation of the knob is 15°, since the rotation amount of the finger U4 is +15°, the operation determination unit 160 determines that the knob 130 has rotated clockwise. When it is determined that the knob 130 has rotated clockwise, the display of the gauge 50 increases by one step, as shown in FIG. 2.

Figure 9B:
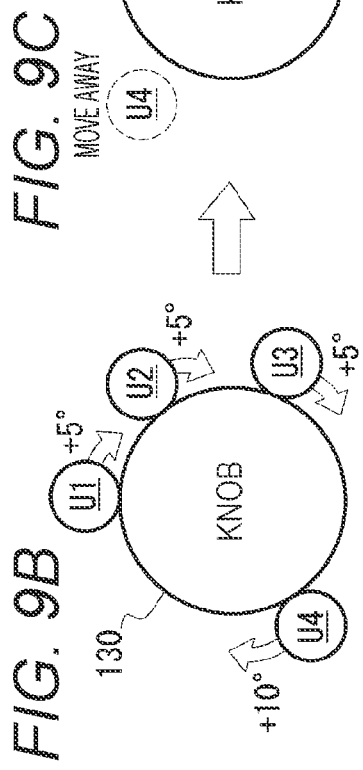
Figure 9C:
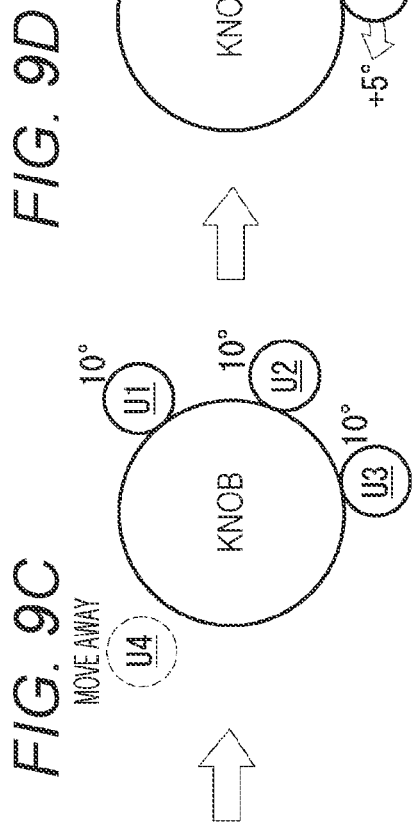
Figure 9D:
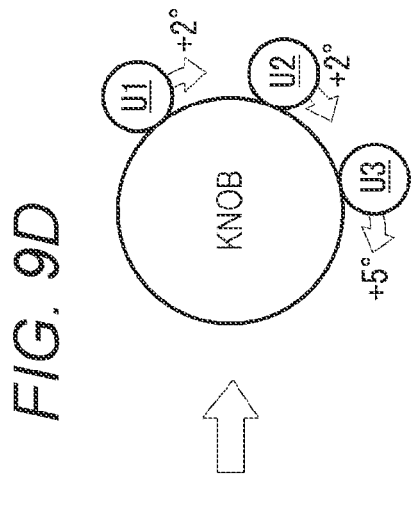
Figure 9G:
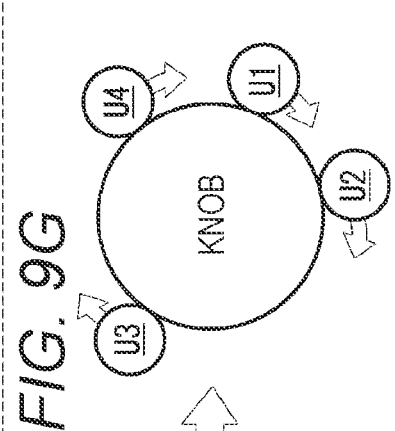

On the other hand, when the rotation amount of each of the fingers U1 to U3 is +5° and the rotation amount of the finger U4 is +10° as illustrated in FIG. 9B, and when the finger U4 having the largest rotation amount is removed from the knob 130 before reaching the threshold value (when the sensing of the finger U4 disappears) as illustrated in FIG. 9C, the count value of the rotation amount)(+10° of the finger U4 that is away is taken over or transferred to the remaining fingers U1, U2, and U3 during the sensing. That is, the fingers U1, U2, and U3 that are continuously sensed count the rotation amount of +5° at the time when the sensing of the finger U4 disappears, but all the rotation amounts of the fingers U1, U2, and U3 are updated to the rotation amount of +10° of the finger U4 that has disappeared. Thereafter, when the rotation amount newly counted by the fingers U1 to U3 is added to the updated rotation amount of +10°, and +5° is counted as the new rotation amount of the finger U3, for example, as illustrated in FIG. 9D, the total rotation amount of the finger U3 reaches +15°, and thus the operation determination unit 160 determines that the knob 130 has been rotated.

Figure 9F:
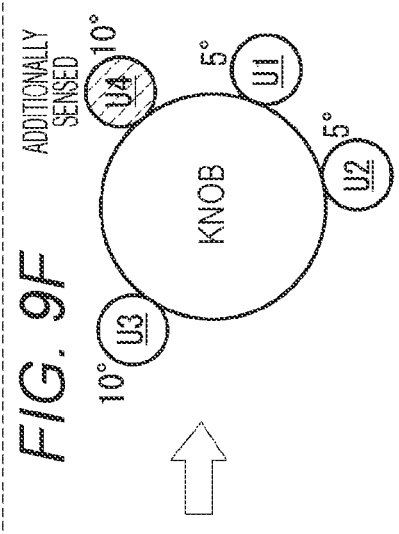
Figure 9E:
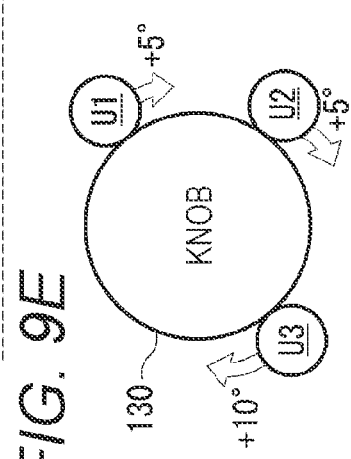

When the sensing of the finger U4 is added, as illustrated in FIG. 9F, while the rotation amounts of the fingers U1 and U2 are +5° and the rotation amount of the finger U3 is +10° as illustrated in FIG. 9E, the rotation amount +10° counted by the finger U3 having the largest rotation amount is allocated to the added finger U4. At this time, the fingers U1 and U2 may maintain the counted rotation amount +5°, as is, or the rotation amounts of the fingers U1 and U2 may also be updated to the rotation amount +10° of the finger U3.

4. After the determination of rotation, the operation determination unit 160 resets the count value of the rotation amounts of all the fingers to 0, returns to the above step 1 with the finger position at that time as a reference point, and again senses the finger touched on the knob and its angle.

As described above, according to the present embodiment, since the presence or absence of the rotation operation on the knob is determined while monitoring the rotation amounts of all the fingers touching the knob 130, it is possible to stably determine the rotation operation on the knob, even if the number of sensed fingers changes.

Figure 10A:
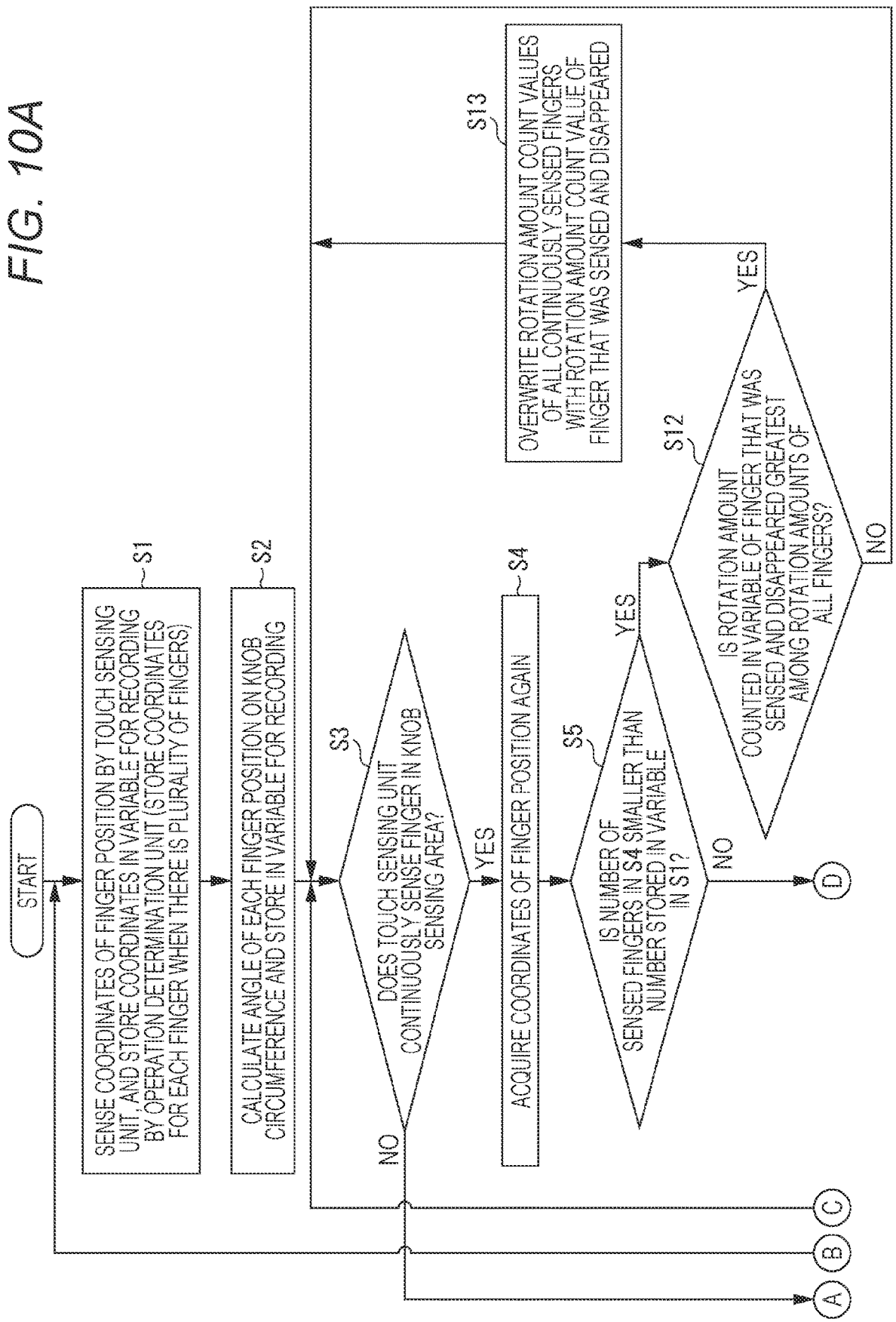
FIG. 10A is an example of an operation flow of a sensing algorithm of a rotation operation of a knob of the input display device according to the embodiment of the present disclosure; and, FIG. 10B is an example of an operation flow of the sensing algorithm of the rotation operation on the knob of the input display device according to the embodiment of the present disclosure.
Figure 10B:
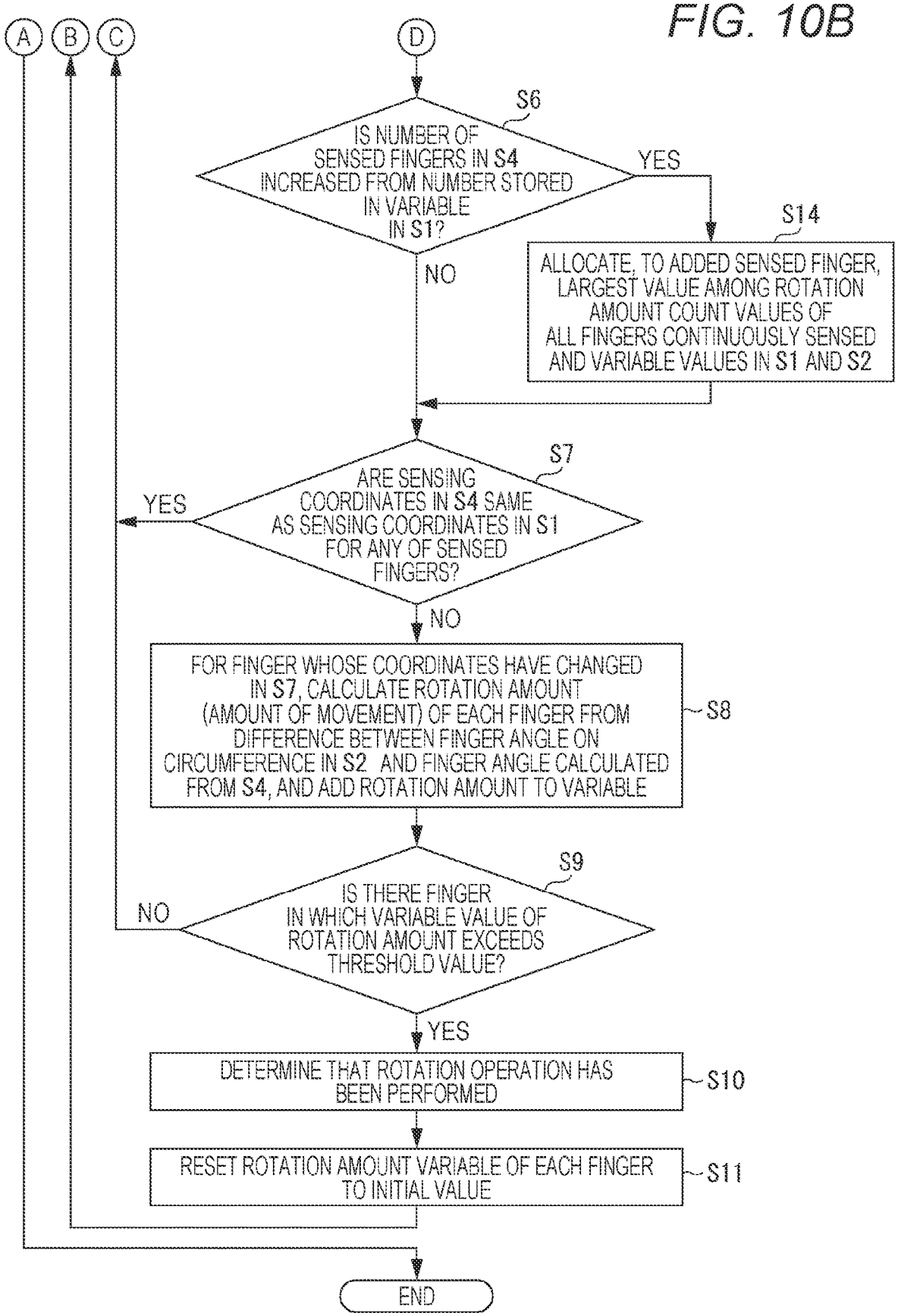

Next, an example of a flow of an algorithm for determining the rotation operation on the knob in the input display device of the present embodiment is illustrated in FIGS. 10A and 10B. First, the coordinates (x, y) of the touch position of the finger are sensed by the touch sensing unit 150, and the operation determination unit stores the sensed coordinates as a variable for recording (S1). When the touch positions of a plurality of fingers are sensed, the coordinates of each finger are stored as a variable. Next, the operation determination unit 160 calculates a finger angle (0 to) 360° on the knob circumference from the sensed coordinates of the finger, and stores the calculated finger angle as a variable for recording (S2). When the coordinates of the plurality of fingers are sensed, the respective finger angles are calculated, and the respective finger angles are stored as variables.

The touch sensing unit 150 measures the electrostatic capacitance of the sensor of the touch panel 120 at a constant cycle, and senses the coordinates of the touch position of the finger from the measurement result. The operation determination unit 160 determines whether the touch sensing unit 150 continuously senses the coordinates of the finger in the knob sensing area (S3), and when it is determined that the coordinates of the finger are continuously sensed, the operation determination unit acquires the coordinates of the touch position of the finger from the touch sensing unit 150 again (S4). When the coordinates are acquired, the operation determination unit 160 determines whether the number of sensed fingers in step S4 is smaller than the number stored in the variable in step S1 (S5), and when the number of sensed fingers is not smaller than the number stored in the variable, the operation determination unit determines whether the number of sensed fingers is increased (S6).

When the number of sensed fingers has not increased in step S6, that is, when there is no change in the number of sensed fingers, the operation determination unit 160 determines whether the sensing coordinates in step S4 and the sensing coordinates in step S1 are the same for any of the fingers (S7). In a case where the sensing coordinates of any of the fingers are the same, the finger does not move, and thus the processing returns to step S3. When the sensing coordinates are not the same, the rotation amount (amount of movement) of each finger is calculated from the difference between the finger angle on the circumference in step S2 and the finger angle calculated from step S4 for the finger whose coordinates have changed in step S7, and the rotation amount is added as a variable (S8).

Next, the operation determination unit 160 determines whether there is a finger whose variable value of the rotation amount exceeds the threshold value (S9), and when there is a finger whose variable value exceeds the threshold value, it is determined that the rotation operation on the knob has been performed (S10). When it is determined that there is the presence of the rotation operation, the operation determination unit 160 resets the rotation amount variable of each finger to the initial value (0) (S11).

On the other hand, in a case where the number of sensed fingers has decreased in step S5, the operation determination unit 160 determines whether a rotation amount counted in the variable of the finger that was sensed and disappeared is the largest among the rotation amounts of all the fingers (S12). In a case where the rotation amount is the largest, the operation determination unit overwrites the rotation amount count values of all the continuously sensed fingers with the count value of the finger that was sensed and disappeared (S13), and the processing returns to step S3.

When the number of sensed fingers is increased in step S6, the operation determination unit 160 allocates, to the added sensed finger, the largest value among the rotation amount count values of all the fingers continuously sensed and the variable values in steps S1 and S2 (S14). The process then proceeds to step S7.

The flow illustrated in FIGS. 10A and 10B is an example for implementing an algorithm for determining the presence or absence of the rotation operation of the present embodiment, and the present disclosure is not necessarily limited to such a flow. In the above embodiment, 15° is used as the threshold value of the rotation amount for determining the presence or absence of the rotation operation on the knob. However, this is an example, and the threshold value may be another value. In the above embodiment, the cylindrical knob 130 is exemplified as the three-dimensional UI unit, but this is only an example. For example, other shapes, such as a conical finger grip or a conical button, may also be used.

The preferred embodiments of the present disclosure have been described in detail above. However, the present disclosure is not limited to the specific embodiments, and thus various modifications and alterations can be made in the scope of the gist of the invention in the claims.

What is claimed is:

1. An input display device comprising:
a display configured to display an image,
a capacitive touch panel attached to the display,
at least one three-dimensional operation unit on a front face of the touch panel, wherein the at least one three-dimensional operation unit is not moveable relative to the touch panel, and
a sensing unit configured to measure an electrostatic capacitance of the touch panel and sense an operation on the touch panel based on the measured electrostatic capacitance,
wherein the sensing unit senses rotation amounts of any fingers touching the operation unit, and determines that a rotation operation on the operation unit is performed when a sensed rotation amount of any of the fingers reaches a threshold value,
wherein, in a case where sensing of a finger disappears before a rotation amount of the finger having a largest rotation amount reaches the threshold value, the sensing unit updates rotation amounts of remaining fingers to a rotation amount of the finger having the largest rotation amount.

2. The input display device according to claim 1, wherein, in a case where sensing of a finger touching the operation unit is added in during the operation, the sensing unit allocates a rotation amount of a finger having a largest rotation amount to a rotation amount of an added finger.

3. The input display device according to claim 1, wherein the sensing unit resets a sensed rotation amount of a finger when determining that a rotation operation on the operation unit is performed.

4. The input display device according to claim 1, further comprising a display unit configured to display a gauge, corresponding to a rotation operation, around the operation unit of the display.

5. The input display device according to claim 4, wherein the display unit displays an icon representing an input operation at a corresponding position of the operation unit of the display.

6. The input display device according to claim 1, wherein the operation unit has a cylindrical knob shape, a cylindrical button shape, or a cylindrical finger grip shape.

7. An input display device comprising:
a display configured to display an image,
a capacitive touch panel attached to the display,
at least one three-dimensional operation unit on a front face of the touch panel, and
a sensing unit configured to measure an electrostatic capacitance of the touch panel and sense an operation on the touch panel based on the measured electrostatic capacitance,
wherein the sensing unit senses rotation amounts of any fingers touching the operation unit, and determines that a rotation operation on the operation unit is performed when a sensed rotation amount of any of the fingers reaches a threshold value; and,
wherein, in a case where sensing of a finger disappears before a rotation amount of the finger having a largest rotation amount reaches the threshold value, the sensing unit updates rotation amounts of remaining fingers to a rotation amount of the finger having the largest rotation amount.

8. An input display device comprising:
a display configured to display an image,
a capacitive touch panel attached to the display,
at least one three-dimensional operation unit on a front face of the touch panel, and
a sensing unit configured to measure an electrostatic capacitance of the touch panel and sense an operation on the touch panel based on the measured electrostatic capacitance,
wherein the sensing unit senses rotation amounts of any fingers touching the operation unit, and determines that a rotation operation on the operation unit is performed when a sensed rotation amount of any of the fingers reaches a threshold value; and,
wherein, in a case where sensing of a finger touching the operation unit is added in during the operation, the sensing unit allocates a rotation amount of a finger having a largest rotation amount to a rotation amount of an added finger.

9. An input display device comprising:
a display configured to display an image,
a capacitive touch panel attached to the display,
at least one three-dimensional operation unit on a front face of the touch panel, wherein the at least one three-dimensional operation unit is not moveable relative to the touch panel, and a sensing unit configured to measure an electrostatic capacitance of the touch panel and sense an operation on the touch panel based on the measured electrostatic capacitance, wherein the sensing unit senses rotation amounts of any fingers touching the operation unit, and determines that a rotation operation on the operation unit is performed when a sensed rotation amount of any of the fingers reaches a threshold value, wherein, in a case where sensing of a finger touching the operation unit is added in during the operation, the sensing unit allocates a rotation amount of a finger having a largest rotation amount to a rotation amount of an added finger.

10. The input display device according to claim 9, wherein the sensing unit resets a sensed rotation amount of a finger when determining that a rotation operation on the operation unit is performed.

11. The input display device according to claim 9, further comprising a display unit configured to display a gauge, corresponding to a rotation operation, around the operation unit of the display.

12. The input display device according to claim 11, wherein the display unit displays an icon representing an input operation at a corresponding position of the operation unit of the display.

13. The input display device according to claim 9, wherein the operation unit has a cylindrical knob shape, a cylindrical button shape, or a cylindrical finger grip shape.

* * * * *